(12) United States Patent
Ventura

(10) Patent No.: US 6,321,283 B1
(45) Date of Patent: Nov. 20, 2001

(54) METHOD AND APPARATUS FOR DETERMINING A DATA TRANSMISSION CAPACITY BETWEEN COMMUNICATIVELY CONNECTED SOURCE AND TARGET DEVICES

(75) Inventor: Thorne Travers Ventura, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/274,026

(22) Filed: Mar. 22, 1999

(51) Int. Cl.[7] .................................................. G06F 13/00
(52) U.S. Cl. ........................ 710/107; 714/25; 714/824
(58) Field of Search .................................. 709/227, 232; 710/1, 20, 29, 34, 65, 100, 107, 101, 104, 129; 714/25, 32, 47, 712, 824

(56) References Cited

U.S. PATENT DOCUMENTS

| | | | |
|---|---|---|---|
| 4,149,142 | * 4/1979 | Kageyama et al. | 340/146.1 |
| 5,177,480 | * 1/1993 | Clark | 341/51 |
| 5,815,667 | * 9/1998 | Chien et al. | 709/232 |
| 5,819,053 | * 10/1998 | Goodrum et al. | 710/126 |

FOREIGN PATENT DOCUMENTS

402152333-A * 6/1990 (JP) ..................................... 455/12.1

* cited by examiner

*Primary Examiner*—Xuan M. Thai
(74) *Attorney, Agent, or Firm*—Arnold & Associates; Leslie Van Leeuwen

(57) ABSTRACT

The field of the present invention is related to the transmission of data between a source device and a target device. More particularly, the present invention relates to the determination of a capacity limitation associated with the communication connection between a source device which is the source of a data transmission and a target device which is the target of a data transmission. Even more particularly, the present invention relates to determining the actual data transmission capacity of the communication connection between the source device and the target device.

35 Claims, 6 Drawing Sheets

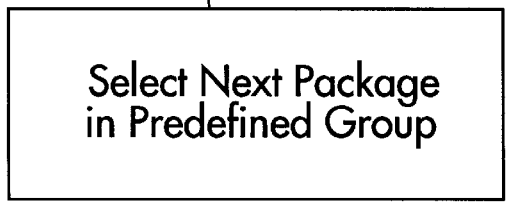
FIG. 5
FIG. 6
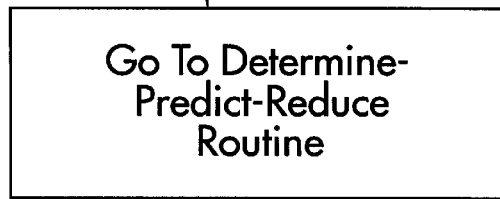
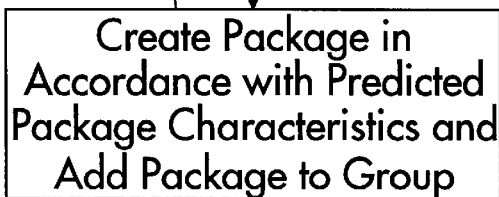
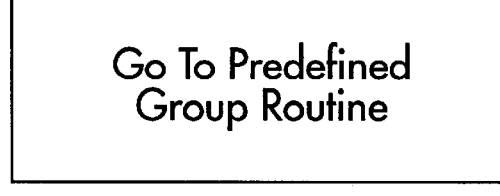
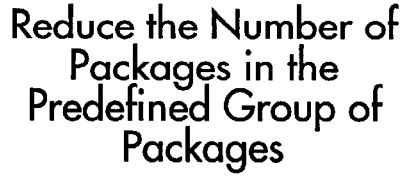
FIG. 7
FIG. 8

METHOD AND APPARATUS FOR DETERMINING A DATA TRANSMISSION CAPACITY BETWEEN COMMUNICATIVELY CONNECTED SOURCE AND TARGET DEVICES

BACKGROUND OF THE INVENTION

1. Field of the Invention

The field of the present invention is related to the transmission of data between a source device and a target device. More particularly, the present invention relates to the determination of a capacity limitation associated with the communication connection between a source device which is the source of a data transmission and a target device which is the target of a data transmission. Even more particularly, the present invention relates to determining the actual data transmission capacity of the communication connection between the source device and the target device.

2. Description of the Related Art

Data transmission from a source device to a target device has become very common place for many people today. For example, sending and receiving e-mail is accomplished by transferring data from the first source device, the computer of the sender of the e-mail, to a network computer, the first target device. The first target device is also the second source device, because it then transmits the data to a second target device. The network computers continue to transmit the data between themselves until, finally, the last network computer transmits the data to the last target device, the computer of the receiver of the e-mail.

People who work in offices with a computer on an internal network have basically the same setup. However, there are usually fewer computers related to the transmission of data. A person using a computer connected to a small network, for example, whom saves a word processor document on a network drive rather than his computer's internal hard drive, transmits data directly from his source computer to a network hard drive, the target device. In each transmission of data, a coordination must take place between the source device and the target device such that the data that is received by the target device is exactly the same as the data transmitted from the source device.

To address this problem, various methods exist in the prior art, none of which are completely satisfactory. For example, one method comprises attaching coded data to each transmission such that when a transmission received by the target device does not exactly match the transmission initiated by the source device, the target device recognizes the errors and requests a retransmission of the data.

Although the retransmission of data is desirable in the sense that it improves the accuracy of data transmissions from a source device to a target device, retransmission of data is not desirable in the sense that it increases the amount of time required to complete a data transmission. Further, a reoccurring retransmission is a significant problem.

In another example of the prior art, there was an attempt to resolve this problem by setting the data transmission capacity at the capacity of the source computer or the target computer, whichever was lowest. The connection between the computers was not normally considered a limiting factor, because the cable used to connect the computers is usually rated for a data transmission capacity at least in excess of the data transmission capacity of the lowest capacity computer. In actual applications, however, retransmissions still occur and still cost network users time and money.

It is desirable, therefore, to anticipate the problems that reoccur during transmission of data that trigger a retransmission and reduce the number of retransmissions by correcting or working around the problems.

A further problem with the existing art is the inability to adequately test and troubleshoot a computer network connection. For an existing connection, if the cable used is short, accessible, and the apparent source of a problem, the cable is simply replaced in the hope that the problem is resolved. In big networks integrated into large buildings or in small networks residing in a residential home, the cable is not as accessible. Therefore, the cable is tested. A prevalent practice for testing cables involves checking the continuity of each wire within the cable. Although tests have the ability to find major defects in a network connection, they are not accurate enough to determine minor defects, such as defects in the insulation of the communication connection. In addition, the practice does not find alternative solutions to replacing the network cable when such replacement would involve a significant cost and effort. Therefore, it is desirable to find a way to maximize the transmission capacity of a damaged or defective network connection cable.

Another prevalent practice is to carry a laptop around to each existing network connection and test the connection by trying to access data on a network drive. This practice is also inadequate, because it tests only for significant deficiencies in the data transmission capacity and does not offer methods to increase the data transmission capacity without pulling a new cable.

SUMMARY OF THE INVENTION

Various objects of the present invention are addressed to the above-mentioned problems. For example, according to one aspect of the invention, a method is provided for determining a data transmission capacity between communicatively connected source and target devices. The method comprises selecting a package to transmit, transmitting the package from a source device to a target device, receiving a rating representing the efficiency of said transmitting the package from a source device to a target device, recording the rating, and determining at least one package characteristic for the package with a rating representing a high transmission efficiency with respect to the ratings received.

According to various embodiments, the method further comprises modifying a software program to configure a data transmission queue such that packages are created substantially in accordance with at least one determined package characteristic.

According to another aspect of the present invention, a device is provided for determining a data transmission capacity between communicatively connected source and target devices. The device comprises a means for selecting a package to transmit, a means for transmitting the package from a source device to a target device, a means for receiving a rating representing the efficiency of said transmitting the package from a source device to a target device, a means for recording the rating, and a means for determining at least one package characteristic for the package with a rating representing a high transmission efficiency with respect to the ratings received.

According to various embodiments, the device further comprises a means for modifying a software program to configure a data transmission queue such that packages are created substantially in accordance with at least one determined package characteristic.

According to still a further aspect of the invention, another device for determining a data transmission capacity between communicatively connected source and target devices is provided. Here, the device comprises a package selector communicatively connected to a package storage medium, a package transmitter responsive to said package selector and communicatively connected to the communicative connection between the source and target devices, a rating receiver responsive to said package transmitter and communicatively connected to the communicative connection between the source and target devices, a rating recorder responsive to said rating receiver and communicatively connected to a rating storage medium, and a package characteristic determiner communicatively connected to the rating storage medium and responsive to said package selector.

According to various further embodiments, the device further comprises a queue software program modifier responsive to and communicatively connected to said package characteristic determiner.

The present invention resolves the problems of the prior art by anticipating that factors other than the ratings of the computers and cables contribute to data transmission problems. The present invention also recognizes that a significant number of the factors contributing to data transmission problems are present on a regular basis and that, even though the factors could be identified and corrected, it is more cost effective, in many cases, to work around the problems. Therefore, the present invention solves these problems by accurately measuring the data transmission capacity between a source device and one or more target devices. The present invention also modifies software programs to optimize data transmissions such that data retransmissions are eliminated or, at least, minimized. For example, when a network connection cable is damaged and it is undesirable to replace the cable, the prior art offered no solution, but the present invention does offer an alternative solution (i.e., a new package configuration to maximize the data transmission capacity of the damaged cable). Once the data transmission capacity is maximized, the user has the ability to make a well-informed decision, knowing all the potential alternatives, as to whether the expense and effort required to replace the cable is worth the benefit that can be achieved.

In addition to troubleshooting existing network connections, the present invention reveals the problems before they begin to interfere with the operation of a computer network. For example, when a building is being constructed, the present invention verifies the integrity of the network cables that reside within the walls of the building upon completion. A hand held embodiment of the invention is easily moved to each computer network connection to verify not only that the continuity of the cable but also the integrity of the insulation. A hand held embodiment of the invention is easy to carry from one connection to the next and tests the data transmission capacity between any one point on the computer network to any second point where a target device is configured to accept a transmission of data (e.g. a second hand held embodiment of the invention). Then, when an unusually low data transmission capacity is discovered, the user is alerted to the fact that the cable, or installation thereof, is defective, the cable has been damaged, or the length of the cable detrimentally affects the data transmission capacity.

The foregoing and other objects, features and advantages of the invention will be apparent from the following more particular description of an example embodiment of the invention, as illustrated in the accompanying drawings wherein like reference numbers represent like parts of the invention.

BRIEF DESCRIPTION OF THE DRAWINGS

FIG. 5 depicts a flow chart of a package selection mode.

FIG. 6 depicts a flow chart of a package selection mode including steps to reduce the number of packages to select from.

FIG. 7 depicts a flow chart of a package selection mode including steps to reduce the group of packages to select from and add a package more likely to improve results of test.

FIG. 8 depicts a flow chart that predicts package characteristics and reduces the number of packages to select from.

DETAILED DESCRIPTION

Figure 1:
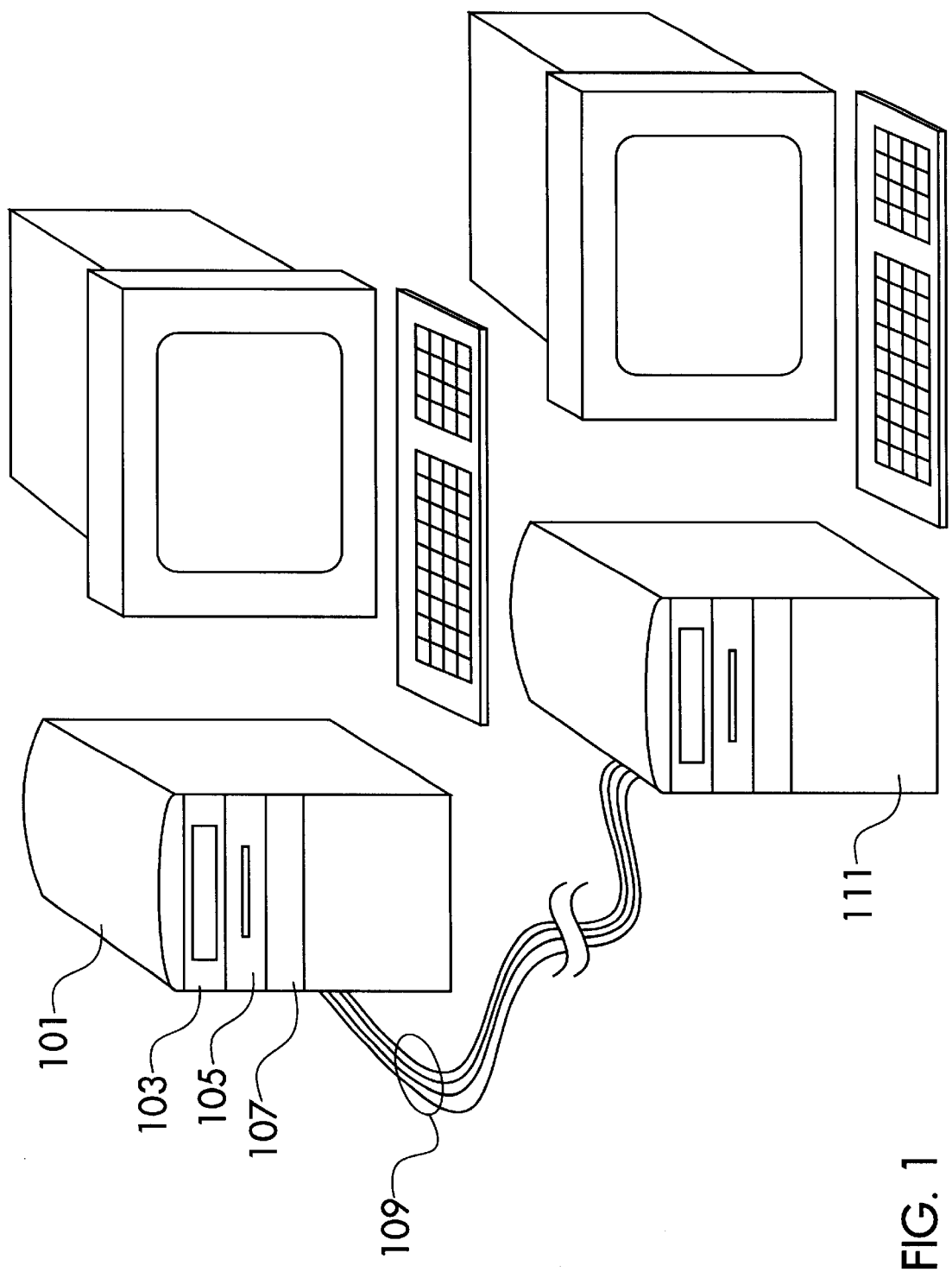
FIG. 1 depicts a first, three-dimensional, example embodiment of the invention.
Figure 2:
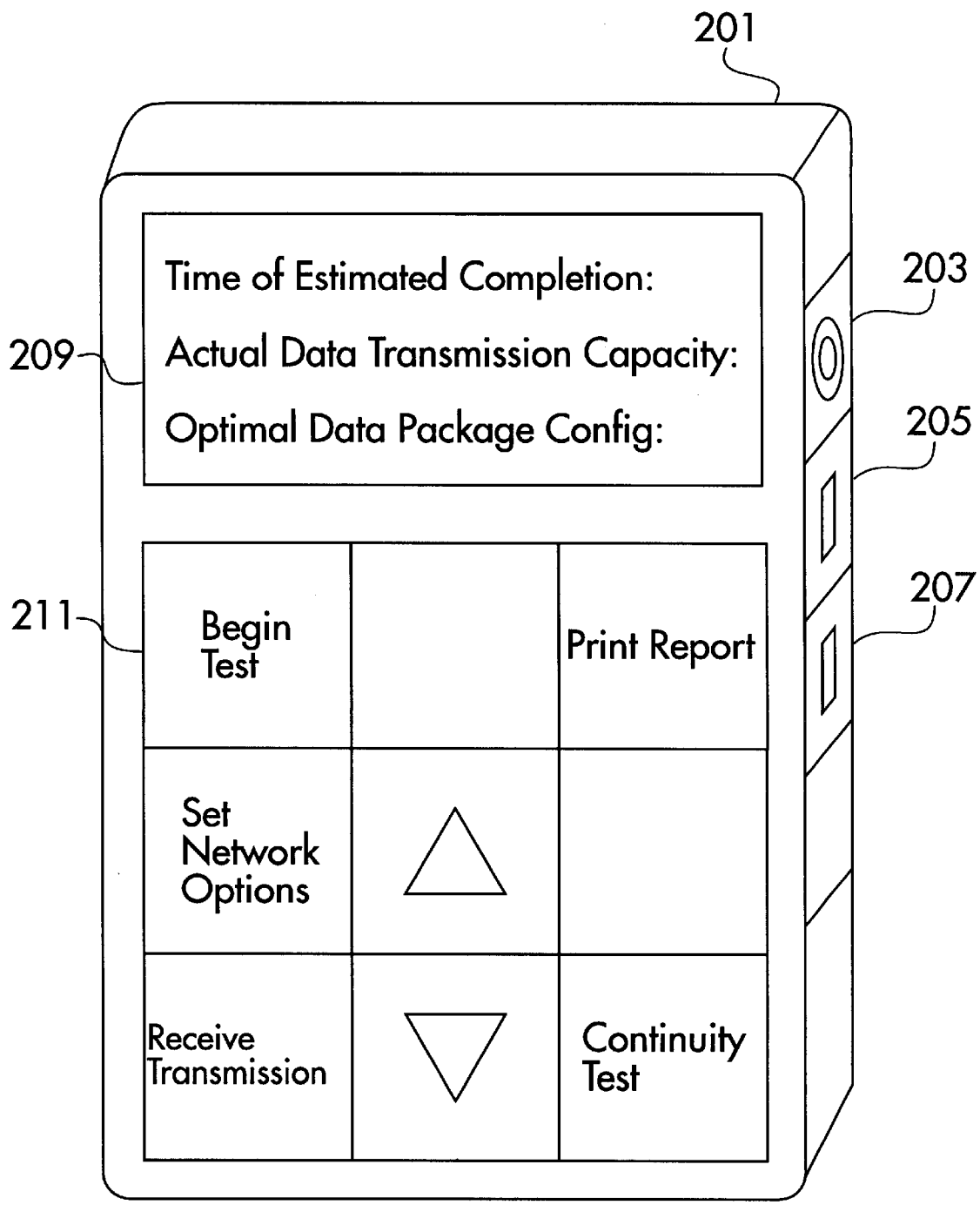
FIG. 2 depicts a second, three-dimensional, example embodiment of the invention.
Figure 3:
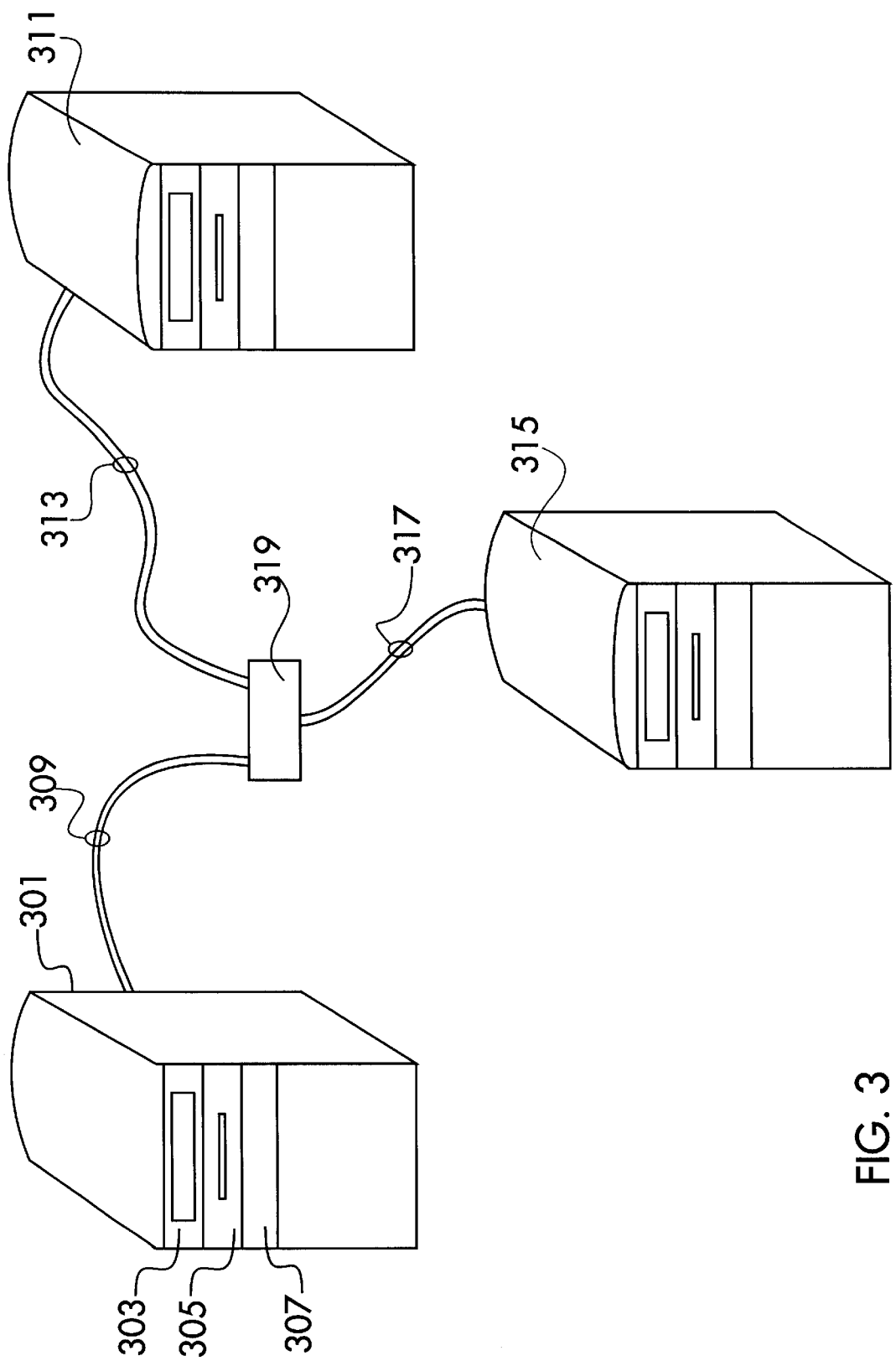
FIG. 3 depicts a third, three-dimensional, example embodiment of the invention.

The following detailed descriptions describe three example embodiments of the invention including an example for monitoring and increasing the efficiency of a critical high capacity connection between two parts of a single computer network shown in FIG. 1, an example of a convenient, hand held microprocessor based device for testing and troubleshooting computer networking problems shown in FIG. 2, and an example for monitoring and increasing the efficiency of multiple computer connections to a single computer on a computer network shown in FIG. 3. Each embodiment contains a set of software routines for accomplishing part of the present invention depicted by flow charts in FIGS. 4–12. Note that the main software routine embodying part of the present invention is depicted in a flow chart in FIG. 4.

Figure 4:
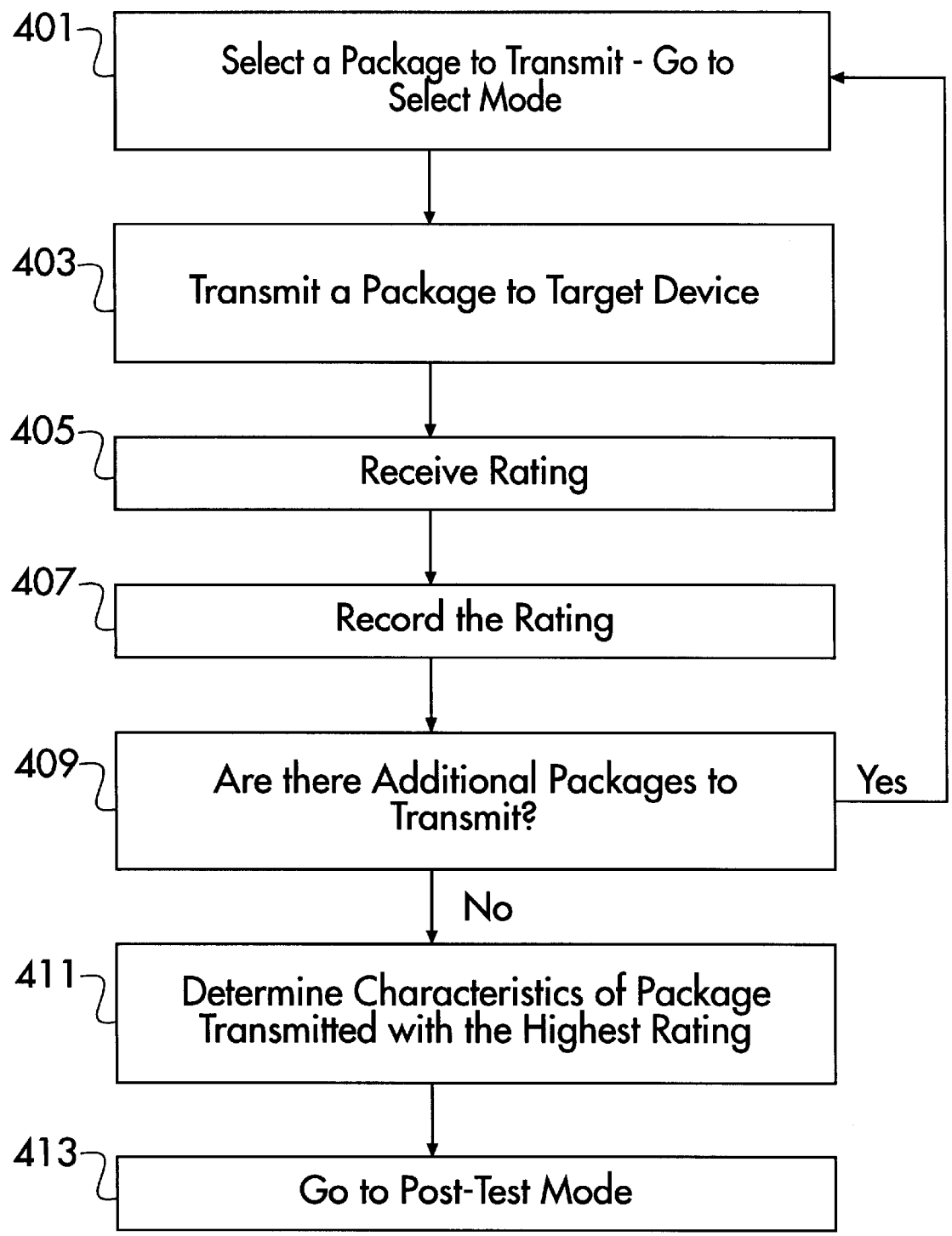
FIG. 4 depicts a general flow chart for each example embodiment of the invention.

The software routines depicted in FIGS. 5–8 are example routines available to execute the first step 401 of the flow chart depicted in FIG. 4 and any of the example routines depicted in the flow charts in FIGS. 5–7 can be initiated from the first step 401 in FIG. 4 to select a package to be transmitted to a target computer.

Figure 9:
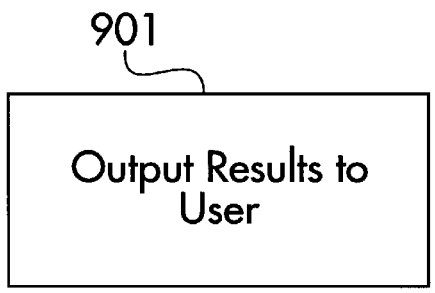
FIG. 9 depicts a flow chart of a post-test mode output routine.
Figure 10:
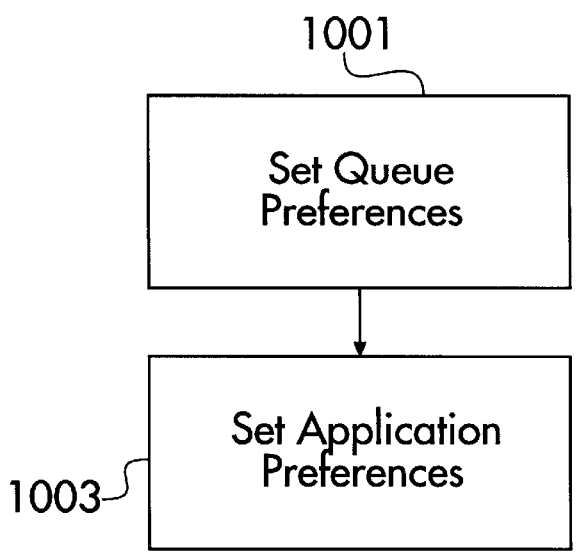
FIG. 10 depicts a flow chart of a post-test mode modify software program routine.
Figure 11:
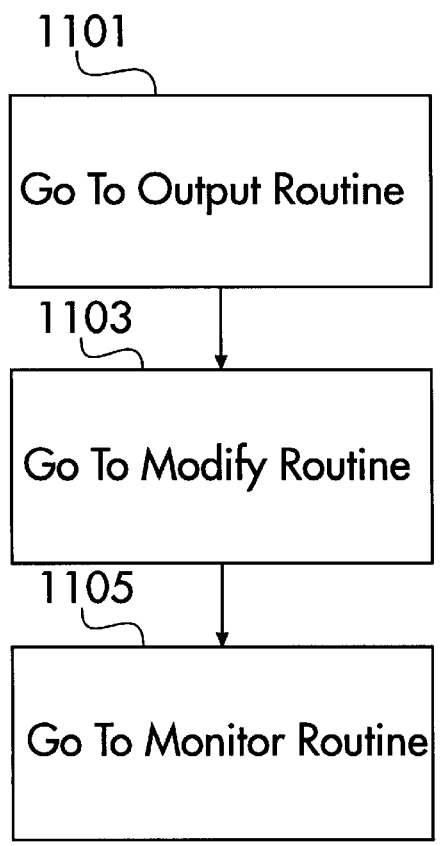
FIG. 11 depicts a flow chart of a post-test mode combined output routine, modify software program routine and monitor routine.
Figure 12:
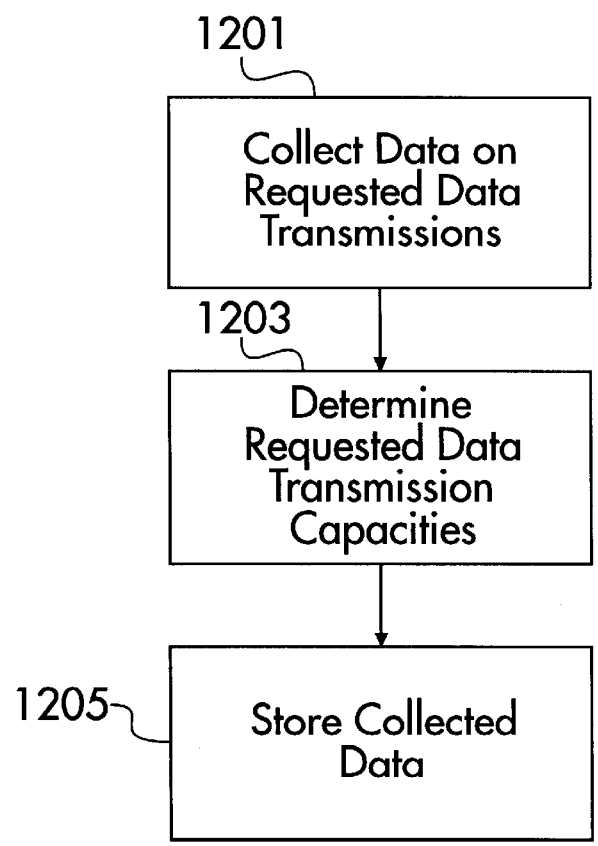
FIG. 12 depicts a flow chart of a post-test mode monitor routine.

The software routines depicted in FIGS. 9–12 are example routines available to execute the last step 413 of the flow chart depicted in FIG. 4 and one or any combination of the example routines depicted in the flow charts in FIGS. 9, 10, and 12, executed in any order, accomplish the last step 413 in FIG. 4. For example, the flow chart in FIG. 11 is just a combination of the other three software routines depicted in FIGS. 9, 10, and 12.

Referring to FIG. 1, there is a first example embodiment for an apparatus for determining a data transmission capacity between communicatively connected microprocessor based devices. The first example embodiment comprises of a computer network contained in two separate buildings. A communication connection 109 runs from a computer 101 in a first building to a computer 111 in a second building such that the network computers in the first building send and receive data from the network computers in the second building via the communication connection 109. Both of the computers shown 101 and 111 act as a source and target computer such that data is transmitted from computer 101 to computer 111 and from computer 111 to computer 101, simultaneously. The actual transmission of data is accomplished by a separate program that transmits information entered into transmission queues, such as TCP/IP, as is well known in the art. For purposes of clarity, however, the following descriptions discuss only one computer as a source computer 101 and one computer as a target computer 111. Since both computers 101 and 111 act as source and target computers, the descriptions of the source computer 101 apply equally to the target computer 111 and vice versa, dependent upon the function the computer is performing.

Referring again to FIG. 1, a source computer 101 is communicatively connected to a target computer 111 by a communication cable 109. The source computer 101 comprises four potential local storage means comprising a compact disk reader and writer 103, a floppy disk drive 105, a hard drive 107 and a random access memory chip inside the source computer 101, any of which can be used in place of another storage means. The source computer 101 also contains a software program functioning in accordance with FIGS. 4 and 7–12.

The present example embodiment is designed to maximize the data transmission capacity of the communication connection 109 between two computer networks operating such that computers communicatively connected to the target computer 111, can retrieve data from computers communicatively connected to the source computer 101, and computers communicatively connected to the source computer 101 can send data to computers communicatively connected to the target computer 111, in a manner well known to those of skill in the art. In addition, the present example embodiment is designed to monitor the integrity of the communication connection 109. The integrity is monitored by informing the user if a significant drop in data transmission capacity has occurred such that the problem is brought to the user's attention as quickly as possible.

Alternative acceptable embodiments of the invention comprise a more specialized device in place of the source computer 101 or the target computer 111, or both, as is well known to those of skill in the art. In addition, acceptable embodiments of the invention separate the functions contained in FIGS. 4–12 into separate devices rather than in a single microprocessor based device such that one or more microprocessor controls the functions. A further acceptable embodiment comprises a set of switches in the form of relays or transistors, for example, connected such that one or more of the steps shown in FIGS. 4–12 is accomplished, in a manner well known in the art.

A further acceptable embodiment of the invention includes alternative storage devices such as tape recorders, as are well known to those of skill in the art.

Referring now to FIG. 4, there is shown an example flow chart of the general functioning of a software program used as part of the present example embodiment of the invention. In the initial installation of the program, the user is required to answer questions to customize the software program of the present embodiment to the particular data transmission system such as a time schedule for the program to operate and a location of a software program for the present embodiment to modify in accordance with the results of the determination of the data transmission capacity of the communication connection 109. Also note that measuring the maximum data transmission capacity of any communication connection is relative to the state of data flow through the communication connection during the test and that, any additional data flow must be constant throughout all tests to produce reliable results, as is well known to those of skill in the art. The present example embodiment presumes that the user desired maximum data transmission capacity is the maximum data transmission capacity when the communication connection is devoid of additional data transmissions, i.e. the communication connection is dedicated to testing only and is not used in any other manner during the tests. An alternative embodiment would determine the maximum data transmission capacity within a specific bandwidth while a constant data flow is present in a different bandwidth of the communication connection. The first step of the software program for this example embodiment of the invention comprises selecting a package to be transmitted 401. Each package is data with characteristics comprising a number of files with file sizes. The first two times the first step 401, of the software program in the present embodiment, operates, the software program initiates the predefined group routine in FIG. 5 such that a package is selected from a predefined group of packages 501. The predefined group of packages, in the present example embodiment, is a group supplied with the present example embodiment that have typical maximum package characteristics for a communication connection with the same rated data transmission capacity as the communication connection 109 of the present invention. After the first two times the present embodiment's software program operates, the selecting a package to be transmitted step 401 initiates the predictor-eliminator-creator routine in FIG. 7. In the second step, transmit a package 403, the software program, in the present example embodiment, copies the package selected to be transmitted into a transmission queue such that a second software program, such as TCP/IP, controlling the transmission of data from the source computer 101, transmits the package to the target computer 111, in a manner well known to those of skill in the art. In the third step, receive a rating 405, the software program, in the present example embodiment, receives an acknowledgment that the package placed in the transmission queue has been successfully transmitted from the source computer 101 to the target computer 111, in a manner well known to those of skill in the art. In the fourth step, record the rating 407, the software program, in the present example embodiment, stores a rating in a rating storage means such that the package associated with the rating can be determined, in a manner well known to those of skill in the art. The rating is data representing the time required to transmit the package. Note that the rating, in the present example embodiment, does not include the time added due to errors in the transmission software program, for example, an internal error in TCP/IP. In the fifth step, a decision is made whether to transmit additional packages 409. The decision 409 in the present example embodiment of the invention comprises calculating the time required to complete software modifications, adding an estimate of the amount of time required to complete the additional data transmission, and comparing the sum to the amount of time that the user has allocated for the tests in a user entered time schedule. The user entered time schedule gives the software program a time window in which to complete the testing and make the system software program modifications, as is discussed in the detailed descriptions for FIGS. 11 and 12. The first time software program incorporating the decision 409 is made, the program bases the decision on the number of modifications required in accordance with the user input. After the first set of modifications is made, as discussed in detail for FIGS. 11 and 12, the software program for the present example embodiment of the invention bases the decision 409 on the time used for prior modifications, in a manner well known to those of skill in the art. In the sixth step, determine characteristics of a package transmitted with the highest rating 411, the software program in the present example embodiment finds the package that transmitted the largest amount of data in the shortest amount of time, using the ratings and package references, as recorded in the record the rating step 407, in a manner well known to those of skill in the art. In the seventh step, go to post-test mode 413, the software program for the present example embodiment of the invention performs a user specified function with the results of the sixth step, determine the characteristics of the package transmitted with the highest rating 413. In the present example embodiment, the user is presumed to have chosen the output-modify-monitor routine in FIG. 11 as the post-test mode.

Alternative acceptable embodiments of the step, select a package to be transmitted 401, comprise a step that creates a package using typical characteristics of a package for the communicative connection 109. The package characteristics are either supplied with the software, supplied by a user, or determined by reading other queue configurations within the network, using methods well known to those of skill in the art. In this way, a predefined group of packages is not required.

Further alternative embodiments of the step, select a package to be transmitted 401, comprise a step that only reduces the number of a predefined group of packages supplied by the user or with the software program for this embodiment of the invention such as the predictor-eliminator routine shown in FIG. 6.

Further alternative embodiments of the step, select a package to be transmitted 401, comprise a step that creates packages within a user specified set of package characteristics.

Alternative acceptable embodiments of the step, transmit a package to the target computer 403, comprise a step that both places the package in a queue to be transmitted and initiates a routine or includes a routine that performs the actual step of transmitting the data.

Alternative acceptable embodiments of the step deciding whether there are any more packages to transmit 409, comprise a routine that has a specified number of packages to transmit and counts down. A further acceptable embodiment comprises a routine that continues to transmit packages until a condition is met, in a manner well known to those of skill in the art. An example condition is that the accuracy of the determination of the data transmission capacity must be within a specified percentage of the rated data transmission capacity of the cable.

Alternative acceptable embodiments of the step, determine characteristics of a package transmitted with the highest rating 411, comprise of displaying the results of each transmission to the user such that the user chooses a group of packages and determines the characteristics of a package with the highest rating within the group.

Referring now to FIG. 7, there is shown an example flow chart of a select a package step 401 of a software program used as part of the present example embodiment of the invention. In the first step of the present routine, go to determine-predict-reduce routine 701, the determine-predict-reduce routine in FIG. 8 is initiated. The routine in FIG. 8, for the present example embodiment of the invention, essentially determines a range of package characteristics that increase or decrease the rating of a package transmission and reduces the predefined group of packages based upon the predicted range of package characteristics. In the second step, create a package in accordance with the predicted package characteristics and add the package to the predefined group 703, a package is created within the range of package characteristics determined in FIG. 8. The package created is chosen from a group of packages representing all permutations of file sizes and number of files, for the amount of data specified by the user for testing. Then, the created package is added to the predefined group of packages such that the created package is available to the select a package step 401 to be selected for transmission to the target computer 111. In the third step, go to predefined group routine 705, the software program initiates the predefined group routine in FIG. 5, as discussed in detail below.

Referring now to FIG. 8, there is shown an example flow chart of a determine-predict-reduce routine which is part of the select a package step 401 of a software program used as part of the present example embodiment of the invention. In the first step, determine a trend 801, a function of the recorded rating versus each package characteristic of previously transmitted packages is determined. In the second step, predict package characteristics from the trends 803, a range of package characteristics is determined that encompass either package characteristics of packages that increase the rating of a package transmitted or decrease the rating of a package transmitted, in a manner well known to those of skill in the art. In the third step, reduce the number of packages in the predefined group of packages 805, the packages within the package characteristics of the predicted package characteristic range are separated from those outside the predicted package characteristic range, in a manner well known to those of skill in the art. The packages with package characteristics that decrease the rating of a package transmitted are then removed from the predefined group of packages.

Alternative acceptable embodiments of the routine in FIG. 8 do not include a step that reduces the number of packages in the predefined group of packages.

Alternative acceptable embodiments of the step, determine a trend 801, comprise determining a trend for all package characteristics with respect to the recorded rating rather than determining a single trend function for each package characteristic versus the recorded rating.

Referring now to FIG. 5, there is shown an example flow chart of a select a package step 401 of a software program used as part of the present example embodiment of the invention. In the present embodiment of the invention, the predefined group routine in FIG. 5 is initiated by the predictor-eliminator-creator routine in FIG. 7. The predefined group routine, however, could act as a stand alone routine initiated directly from the main program depicted in the general flow chart in FIG. 4. The step involves selecting the next package in an order from a predefined group of packages. The predefined group of packages is supplied with the software program, by the user, or by a package generation routine used in conjunction with the software program.

Referring now to FIGS. 9, 10, 11, and 12, there is shown example flow charts of post-test mode routines of a software program used as part of the present example embodiment of the invention. The first step in FIG. 11, go to output routine 1101, outputs the results of the package transmissions to the user in a default or user specified format via the output routine step 901 in FIG. 9. In the present embodiment, the software program routine in FIG. 9, outputs a comparison of the highest data transmission capacity achieved against the computer network requested data transmissions as determined by the monitor routine in FIG. 12, as discussed below. The present embodiment also outputs the amount of time, if any, that the requested data transmissions exceeded the data transmission capacity of the communication connection 109. In the second step in FIG. 11, go to modify routine 1103, the software program initiates the modify routine in FIG. 10. The modify routine first sets the transmission queue preferences 1001 such that the data in the queue is stored in a form consistent with the package characteristics of the package transmitted with the highest rating. Then the modify routine sets the network software application program's preference files 1003, as instructed by the user during the installation of the software program of the present example embodiment of the invention. In the third step in FIG. 11, go to monitor routine 1105, the monitor routine in FIG. 12, is initiated. The monitor routine runs continuously during the times that are not specified in the user input time schedule, as discussed above, and essentially monitors the amount of data that the networked computers, connected to the source computer 101, request to be transmitted to the networked computers, connected to the target computer 111. The monitor routine, in the present example embodiment of the invention, does not interfere with the network requested data transmissions, it collects data regarding the requested data transmissions.

Alternative acceptable embodiments of the output routine in FIG. 9 include an output of a history of requested data transmissions such that the user determines when, if ever, the needs of the computer network require an increase in the data transmission capacity of the communication connection 109.

Referring now to FIG. 12, there is shown an example flow chart of part of a potential post-test mode routine of the software program used as part of the present example embodiment of the invention. In the first step, collect data on requested data transmissions 1201, the software program collects data representing the amount of data that is requested to be transmitted to the target computer 111, via the communication connection 109, and data representing the amount of time that is required to transmit the requested data transmission. In the second step, determine requested data transmission capacities 1203, the software program calculates the capacity of the communication connection 109 that is required to transmit the requested data transmission without backlogging subsequent requested data transmissions, in a manner well known to those of skill in the art. Finally, in the last step, store collected data 1205, the collected data is stored in a history file on the compact disk drive 103 such that the data is accessible by the output routine in FIG. 9.

Alternative acceptable embodiments of the collect data step 1201 comprise collection of additional or alternative data that is used along with the data transmission capacity of the communication connection 109 to inform the user the extent to which the data transmission capacity is used or exceeded.

Referring to FIG. 2, there is a second example embodiment for an apparatus for determining a data transmission capacity between communicatively connected source and target devices. The second example embodiment comprises of a hand held testing device 201 that is connected to any network cable in a computer network. The hand held testing device 201 is designed to verify the data transmission capacity from any one point in the computer network to any second point in the computer network such that problems with the installation of network cables or computers is identified. For example, if a computer on an existing computer network connection fails to transmit data to the computer network or transmits data to the computer network at a substantially reduced data transmission rate, the existing computer network connection is plugged into one of the ports on the side of the hand held testing device 203, 205, and 207, depending on the type of network connection, in a manner well known to those of skill in the art. The computer network connection integrity is then tested by the hand held testing device 201 by transmitting packages to a target computer or device on the computer network and verifying the data transmission capacity of the connection. A second example of the use of the hand held testing device 201 is to test new computer network connections in the same manner, before a computer is installed at the network connection. It is important to note again that when a communication connection is tested, the results are affected by the data transmissions occurring on the path being tested. Therefore, if the user is attempting to determine the integrity of the connection by calculating the data transmission capacity, the user should either assure that no transmissions are on the same path or take into account the amount and configuration of the data being transmitted on the same path. Note also that the accuracy of the test results is adversely affected by the existence of a data flow that is not constant.

Referring now to FIGS. 2 and 6, the hand held testing device 201 functions in substantially the same way as the first example embodiment with a couple exceptions. First, the hand held testing device comprises different forms of hardware such as storage devices, displays, and user input devices. The hardware devices are more compact to minimize the size of the hand held testing device 201. The present embodiment of the invention has read only memory, random access memory, and flash card memory rather that hard drives, floppy disk drives and compact disk drives, a liquid crystal display 209 rather than a monitor, and a panel of buttons 211 to receive input from the user rather than a keyboard and mouse. In addition, the hand held testing device 201 comprises a set of network ports 203, 205, and 207 such that any connection within a computer network can be tested. Second, the hand held testing device in the present example embodiment has a different software program than the first example embodiment. The software program in the present embodiment functions as shown in the flow chart in FIG. 4 and differs from the first example embodiment of the invention in two ways. First, the present example embodiment of the invention incorporates the predictor-eliminator select mode routine in FIG. 6 as opposed to the predictor-eliminator-creator routine in FIG. 7, initiated by the select a package step 401 in the first example embodiment of the invention. Lastly, in the present embodiment of the invention, the go to post-test mode step 413 initiates the output routine in FIG. 9 as opposed to the output-modify-monitor routine in FIG. 11 incorporated into the first example embodiment of the invention. Since the general function of the software program shown in FIG. 4 is discussed in detail above, only the specific differences, the predictor-eliminator routine in FIG. 6 and the output routine in FIG. 9 in the present example embodiment are discussed.

The software program for the present example embodiment of the invention, in the first step, select a package to transmit 401, in FIG. 4, initiates the predictor-eliminator routine shown in FIG. 6. The predictor-eliminator routine is chosen for the present example embodiment of the invention, because the routine is designed to return the maximum data transmission capacity more quickly than the other example routines such that several connections are tested in a short amount of time. The first example embodiment, on the other hand, used the predictor-eliminator-creator routine in FIG. 11 which extended the time required to determine the maximum data transmission capacity, because it is designed to run continuously. The first example embodiment is designed to measure the data transmission capacity of the communication connection 109 during times, specified by the user, that the communication connection 109 can be dedicated to solely testing, i.e. no other data transmissions on the line. Then, during user specified times in which the communication connection could not be dedicated to testing (times during which other data transmissions will occur), the first embodiment of the invention monitors the network requested data transmissions comprising an amount of data as well as an amount of time required for the transmissions, such that an activity history is maintained.

An alternative acceptable embodiment of the hand held testing device 201 comprises a select switch that allows the user to designate the package select mode and designate the post-test mode. Example select modes are shown in FIGS. 5–7 and example post-test modes are shown in FIGS. 9–12.

Referring again to FIG. 6, there is shown an example flow chart of a select mode routine of the software program used as part of the present example embodiment of the invention. In the first step in FIG. 6, go to determine-predict-reduce 601, the determine-predict-reduce routine in FIG. 8, is initiated. The determine-predict-reduce routine in FIG. 8 is discussed in detail above. The second step in FIG. 6, go to predefined group routine 603, the predefined group routine in FIG. 5, is initiated. The predefined group routine in FIG. 5 is discussed in detail above. The present select mode routine essentially is given a fixed number of packages to select, i.e. the number of packages in the predefined group of packages. Then the program reduces the number of packages actually transmitted with one or more package characteristic to recorded rating relationships. Finally, the routine selects a package from the reduced number of packages in the predefined group.

Referring now to FIG. 9, there is shown a flow chart of the post-test mode that is implemented upon completion of the routine steps 401–411 in FIG. 4. The present example embodiment of the invention initiates the output routine in FIG. 9 from the go to post-test mode step 413. The output routine displays the data transmission capacity of the network connection on the liquid crystal display 209 along with the package configuration that achieved the data transmission capacity. In addition, the user also has the ability to print the information on a network printer, in a manner well known to those of skill in the art, by pressing a print report button on button panel 211.

Alternative acceptable embodiments of the output routine include displaying information that the user selects from the button panel 211.

Alternative acceptable embodiments of the second example embodiment of the invention include embodiments that initiate post-test routines such as the modify routine in FIG. 10 or the output-modify-monitor routine in FIGS. 11 and 12.

Referring now to FIG. 3, there is shown a third example embodiment of the invention wherein a source computer 301 having a compact disk player 303, a floppy disk drive 305 and a hard drive 307, is communicatively connected to a first target computer 311 via a computer network cable 309 a network hub 319 and a second computer network cable 313, and a second target computer 315 via a computer network cable 309, the network hub 319, and a fourth computer network cable 317. The third example embodiment is provided to show one way to implement an embodiment of the invention on a computer network having more than one computer. The designation of one source computer 301 is made for clarity only, since every computer on a computer network may have the ability transmit data.

Referring now to FIG. 4, there is shown an example flow chart of the general functioning of a software program as part of the invention. The first step, select a package—go to select mode 401, initiates the a user designated select mode. The user, in the present example embodiment, designates the predefined group routine in FIG. 5, the predictor-eliminator routine in FIG. 6, or the predictor-eliminator-creator routine in FIG. 7. Each of the select mode routines FIGS. 5–7 function in the same manner as discussed above except the operations in FIG. 8 wherein the functions are operated on data collected for each target computer, as discussed in detail below. For the present example embodiment, the user is presumed to have designated the predictor-eliminator-creator routine in FIG. 7 as the select mode routine. In the second step, transmit a package 403, the software program in the present example embodiment copies the package selected to be transmitted into a transmission queue for each of the target computers 311 and 315 such that the software program, controlling the transmission of data from the source computer 301, transmits the package to each target computer 311 and 315, in a manner well known to those of skill in the art. In the third step, receive a rating 405, the software program in the present example embodiment receives acknowledgments that the package placed in each transmission queue has been successfully transmitted from the source computer 301 to each target computer 311 and 315. In the fourth step, record the rating 407, the software program in the present example embodiment stores a rating, data representing the time required to transmit the package as well as a reference to the package and the specific target computer 311 and 315 to which the package was transmitted, in a rating storage means comprising the hard drive 307. In the fifth step, a decision is made whether to transmit additional packages 409. The decision 409 in the present example embodiment of the invention comprises determining whether there is enough time left, within a user entered time schedule, to complete another package transmission. The user entered time schedule gives the software program a time window in which to complete the testing and make the system software program modifications, as is discussed in the detailed descriptions for FIGS. 11 and 12. The first time the software program incorporating the decision 409 is made, the software program bases the decision on the number of modifications required. After the first set of modifications are made, as discussed in detail for FIGS. 11 and 12, the software program for the present example embodiment of the invention bases the decision 409 on the time used for prior modifications, in a manner well known to those of skill in the art. In the sixth step, determine characteristics of a package transmitted with the highest rating 411, the software program in the present example embodiment finds a package that transmitted the largest amount of data in the shortest amount of time for both target computers 311 and 315, using the ratings and package references as recorded in the record the rating step 407, in a manner well known to those of skill in the art. In the seventh step, go to post-test mode 413, the software program for the present example embodiment of the invention performs a user specified function with the results of the sixth step 413. In the present example embodiment, the user is presumed to have chosen the output-modify-monitor routine in FIG. 11 as the post-test mode.

Referring now to FIG. 8, there is shown a flow chart for the present embodiment of the invention. In the first step, determine a trend 801, a function of the recorded rating versus each package characteristic of previously transmitted packages to each target computer 311 and 315. The trends are stored such that each rating is related to a specific target computer, in a manner well known to those of skill in the art. In the second step, predict package characteristics from the trends 803, a range of package characteristics is determined that encompass either package characteristics of packages that increase the rating of a package transmitted to both target computers 311 and 315 or decrease the rating of a package transmitted to both target computers 311 and 315, in a manner well known to those of skill in the art. In the third step, reduce the number of packages in the predefined group of packages 805, the packages within the package characteristics of the predicted package characteristic range are separated from those outside the predicted package characteristic range, in a manner well known to those of skill in the art. The packages with package characteristics that decrease the rating of a package transmitted are then removed from the predefined group of packages.

Refer to the discussions above for the remainder of the routines, FIGS. 9–12, since they function the same in the present example embodiment as they do in the first example embodiment.

It will be understood from the foregoing description that various modifications and changes may be made in the example embodiment(s) of the present invention without departing from its true spirit. It is intended that this description is for purposes of illustration only and should not be construed in a limiting sense. The scope of this invention should be limited only by the language of the following claims.

I claim:

1. A method of determining a data transmission capacity between communicatively connected source and target devices, comprising:

selecting a package to transmit;

transmitting the package from a source device to a target device;

receiving a rating representing the efficiency of said transmitting the package from a source device to a target device;

recording the rating; and determining at least one package characteristic for the package with a rating representing a high transmission efficiency with respect to the ratings received.

2. The method according to claim 1 further comprising modifying a software program to configure a data transmission queue such that packages are created substantially in accordance with at least one determined package characteristic.

3. The method according to claim 1 further comprising modifying a software program to organize output data of the software program into packages substantially in accordance with at least one determined package characteristic.

4. The method according to claim 1 further comprising:

collecting data representing a requested data transmission rate for a data transmission;

determining the requested data transmission rate from the collected data; and outputting data to compare the requested data transmission rate with the data transmission capacity from the source device to the target device.

5. The method according to claim 4 further comprising determining the amount of time that the data transmission capacity is exceeded by the requested data transmission rate.

6. The method according to claim 1 wherein said selecting a package to transmit from a source device to a target device comprises selecting a package from a predefined group of packages.

7. The method according to claim 6 further comprising:

determining a trend from the collected data by correlating each package characteristic of packages transmitted with the recorded rating of each package transmitted;

predicting, from the trends, package characteristics to reduce the number of packages in a predefined group of packages; and reducing the number of packages in the predefined group using the predicted package characteristics.

8. The method according to claim 7 further comprising:

creating a package in accordance with the predicted package characteristics and adding the created package to the predefined group of packages.

9. The method according to claim 1 wherein said transmitting a package from the source device to the target device comprises copying a package into a package transmission queue.

10. The method according to claim 1 wherein said receiving a rating for the package transmission comprises receiving data representing an acknowledgment that a package has transmitted from a transmission queue to the target device.

11. The method according to claim 1 wherein said recording the rating for each package comprises storing data representing an amount of the time required to transmit a package such that the rating is associated with the package transmitted.

12. The method according to claim 1 wherein said recording the rating for each package comprises storing data representing a ratio of an amount of data represented by the package transmission to an amount of time required to transmit a package such that the recorded rating is associated with the package transmitted.

13. The method according to claim 1 wherein said determining at least one package characteristic comprises identifying at least one package characteristic for a package with the recorded rating representing a high transmission efficiency with respect to ratings received from transmissions to one target device.

14. The method according to claim 1 wherein said determining at least one package characteristic comprises identifying at least one package characteristic common to the packages transmitted to more than one target device and associated with recorded ratings representing a high transmission efficiency with respect to the recorded ratings of each target device.

15. A device for determining a data transmission capacity between communicatively connected source and target devices, comprising:

a means for selecting a package to transmit;

a means for transmitting the package from a source device to a target device;

a means for receiving a rating representing the efficiency of said transmitting the package from a source device to a target device;

a means for recording the rating; and a means for determining at least one package characteristic for the package with a rating representing a high transmission efficiency with respect to the ratings received.

16. The device according to claim 15 further comprising a means for modifying a software program to configure a data transmission queue such that packages are created substantially in accordance with at least one determined package characteristic.

17. The device according to claim 15 further comprising a means for modifying a software program to organize output data of the software program into packages substantially in accordance with at least one determined package characteristic.

18. The device according to claim 15 further comprising:
    a means for collecting data representing a requested data transmission rate for a data transmission;
    a means for determining the requested data transmission rate from the collected data; and
    a means for outputting data to compare the requested data transmission rate with the data transmission capacity from the source device to the target device.

19. The device according to claim 18 further comprising a means for determining the amount of time that the data transmission capacity is exceeded by the requested data transmission rate.

20. The device according to claim 15 wherein said means for selecting a package to transmit from a source device to a target device comprises a means for selecting a package from a predefined group of packages.

21. The device according to claim 20 further comprising:
    a means for determining a trend from the collected data by correlating each package characteristic of packages transmitted with the recorded rating of each package transmitted;
    a means for predicting, from the trends, package characteristics to reduce the number of packages in a predefined group of packages; and
    a means for reducing the number of packages in the predefined group using the predicted package characteristics.

22. The device according to claim 21 further comprising:
    a means for creating a package in accordance with the predicted package characteristics and
    a means for adding the created package to the predefined group of packages.

23. The device according to claim 15 wherein said means for transmitting a package from the source device to the target device comprises a means for copying a package into a package transmission queue.

24. The device according to claim 15 wherein said means for receiving a rating for the package transmission comprises a means for receiving data representing an acknowledgment that a package has transmitted from a transmission queue to the target device.

25. The device according to claim 15 wherein said means for recording the rating for each package comprises a means for storing data representing an amount of the time required to transmit a package such that the rating is associated with the package transmitted.

26. The device according to claim 15 wherein said means for recording the rating for each package comprises a means for storing data representing a ratio of an amount of data represented by the package transmission to an amount of time required to transmit a package such that the recorded rating is associated with the package transmitted.

27. The device according to claim 15 wherein said means for determining at least one package characteristic comprises a means for identifying at least one package characteristic for a package with the recorded rating representing a high transmission efficiency with respect to ratings received from transmissions to one target device.

28. The device according to claim 15 wherein said means for determining at least one package characteristic comprises a means for identifying at least one package characteristic common to the packages transmitted to more than one target device and associated with recorded ratings representing a high transmission efficiency with respect to the recorded ratings of each target device.

29. A device for determining a data transmission capacity between communicatively connected source and target devices, comprising:
    a package selector communicatively connected to a package storage medium;
    a package transmitter responsive to said package selector and communicatively connected to the communicative connection between the source and target devices;
    a rating receiver responsive to said package transmitter and communicatively connected to the communicative connection between the source and target devices;
    a rating recorder responsive to said rating receiver and communicatively connected to a rating storage medium; and
    a package characteristic determiner communicatively connected to the rating storage medium and responsive to said package selector.

30. The device according to claim 29 further comprising:
    a trend determiner responsive to said package selector and communicatively connected to the package storage medium and the rating storage medium;
    a package characteristic predictor responsive to and communicatively connected to said trend determiner; and
    a predefined package reducer responsive to and communicatively connected to said package characteristic predictor and communicatively connected to the package storage medium.

31. The device according to claim 30 further comprising a package creator responsive to and communicatively connected to said package predictor and communicatively connected to the package storage medium.

32. The device according to claim 29 further comprising an results outputter responsive to and communicatively connected to said package characteristic determiner.

33. The device according to claim 29 further comprising a queue software program modifier responsive to and communicatively connected to said package characteristic determiner.

34. The device according to claim 29 further comprising a software program modifier responsive to and communicatively connected to said package characteristic determiner.

35. The device according to claim 32 further comprising:
    a requested data transmission data collector responsive to and communicatively connected to said package characteristic determiner and communicatively connected to a requested data transmission data storage medium and
    a requested data transmission determiner responsive to and communicatively connected to said package characteristic determiner and communicatively connected to a requested data transmission data storage medium.

* * * * *